United States Patent
Chang

Patent Number: 6,015,360
Date of Patent: Jan. 18, 2000

[54] AUTOMATIC GEARSHIFTING DEVICE OF MULTI-STAGE FLY WHEEL OF BICYCLE

[75] Inventor: David Chang, Taichung Hsien, Taiwan

[73] Assignee: Falcon Industrial Co., Ltd., Taichung Hsien, Taiwan

[21] Appl. No.: 09/098,377

[22] Filed: Jun. 17, 1998

[51] Int. Cl.⁷ ...................................................... F16H 9/00
[52] U.S. Cl. ................................. 474/80; 474/78; 474/82
[58] Field of Search ................................. 474/80, 82, 78, 474/77, 70, 81; 280/238, 236, 81; 475/259, 258

[56] References Cited

U.S. PATENT DOCUMENTS

| | | | |
|---|---|---|---|
| 3,552,233 | 1/1971 | Schwerdhofer | 475/259 |
| 3,661,034 | 5/1972 | Schwerdhofer et al. | 475/259 |
| 3,830,521 | 8/1974 | Gardel et al. | 474/70 X |
| 4,789,379 | 12/1988 | Ozaki et al. | 474/82 |
| 4,832,662 | 5/1989 | Nagano | 474/80 |
| 4,887,990 | 12/1989 | Bonnard et al. | 474/80 X |
| 5,163,881 | 11/1992 | Chattin | 474/78 |
| 5,295,916 | 3/1994 | Chattin | 474/80 X |
| 5,624,335 | 4/1997 | Ando | 474/80 |

*Primary Examiner*—Tamara L. Graysay
*Assistant Examiner*—Marcus Charles
*Attorney, Agent, or Firm*—Browdy and Neimark

[57] ABSTRACT

An automatic gearshifting device of a bicycle multi-stage fly wheel is composed of a main body, a rotary shaft, an urging member, a plurality of weights located in a receiving cell of the main body, and a drive chain guiding mechanism. The rotary shaft is fastened pivotally with the main body. The urging member is slidably mounted on the rotary shaft such that the urging member is capable of being actuated by the centrifugal force of the weights in motion to slide in the direction of the longitudinal axis of the rotary shaft so as to enable the drive chain guiding mechanism to shift the drive chain from one tooth to another tooth of the bicycle multi-stage fly wheel gear cluster.

13 Claims, 8 Drawing Sheets

# AUTOMATIC GEARSHIFTING DEVICE OF MULTI-STAGE FLY WHEEL OF BICYCLE

FIELD OF THE INVENTION

The present invention relates generally to a bicycle rear gearshifting mechanism, and more particularly to an automatic gearshifting device of the bicycle multi-stage fly wheel.

BACKGROUND OF THE INVENTION

The conventional automatic gearshifting device of the bicycle such as the one disclosed in the U.S. Pat. No. 5,163,881, enables a bicyclist to select an appropriate pedaling gear ratio in accordance with the road conditions so as to maximize the riding effect. In other words, such a conventional automatic gearshifting device is capable of an automatic adjustment of the pedaling gear ratio by means of the centrifugal force of the wheel in motion, in conjunction with a plurality of centrifugal bodies which are linked with a gearshifting mechanism. Such a conventional automatic gearshifting, device as disclosed by the U.S. Pat. No. 5,163,881 is defective in design in that it is rather complicated in construction, and that the centrifugal bodies are susceptible to damage caused by the external force, and further that a rear seat passenger of the bicycle is vulnerable to injury by the centrifugal bodies in motion.

SUMMARY OF THE INVENTION

The primary objective of the present invention is to provide a bicycle with an automatic gearshifting device capable of an automatic adjustment of the pedaling gear ratio by means of a plurality of concealed weights capable of being actuated by the bicycle wheel in motion. In addition, the automatic gearshifting device of the present invention is relatively simple in construction and cost-effective.

In keeping with the principle of the present invention, the foregoing objective of the present invention is attained by an automatic gearshifting device of the bicycle multi-stage fly wheel. The device consists of a main body which is fastened pivotally with a rotary shaft such that the main body is mounted on the bicycle frame by means of a fastening arm. A rotary member is fastened with the rotary shaft on which an urging member is slidably mounted on the rotary shaft. A plurality of weights are located in a receiving cell of the rotary member such that the centrifugal force of the weights actuates the urging member to displace in the direction of the longitudinal axis of the rotary shaft, thereby enabling a drive chain guiding mechanism to bring about the automatic gearshifting.

DETAILED DESCRIPTION OF THE INVENTION

Figure 1:
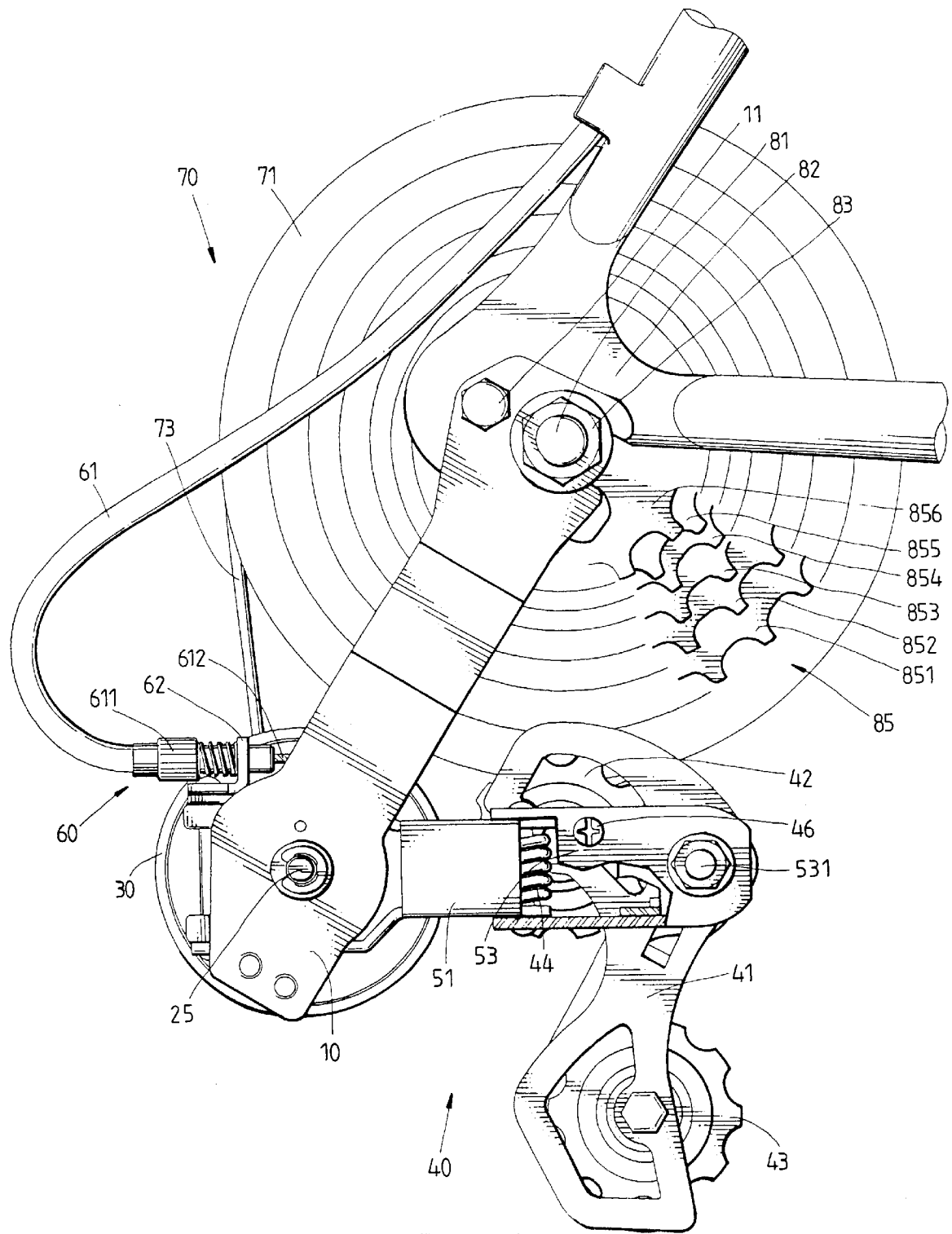
FIG. 1 shows a front view of a first preferred embodiment of the present invention.
Figure 2:
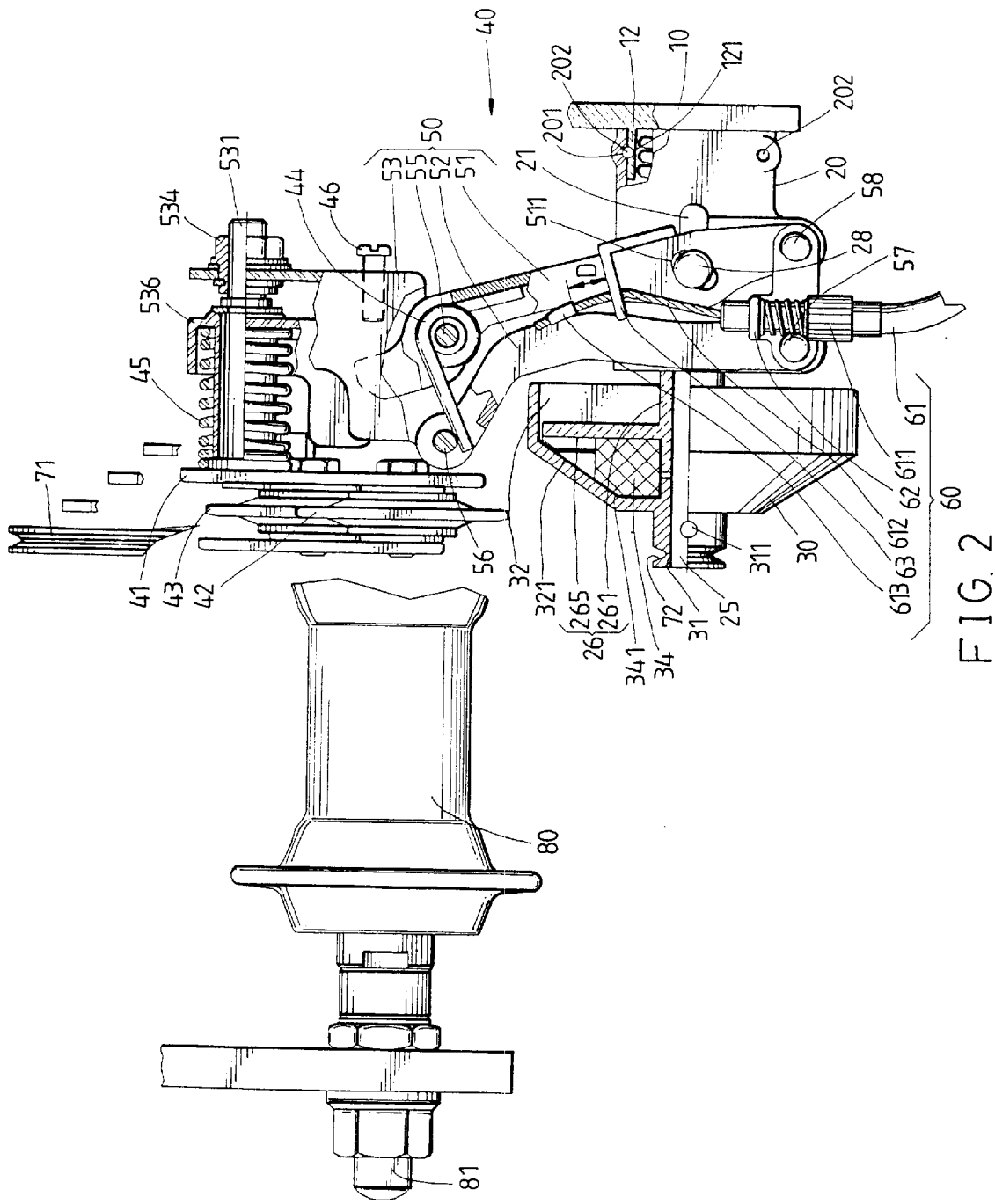
FIG. 2 shows a top view of a drive chain guiding mechanism in relation to the largest tooth of a fly wheel gear cluster of the first preferred embodiment of the present invention.
Figure 3:
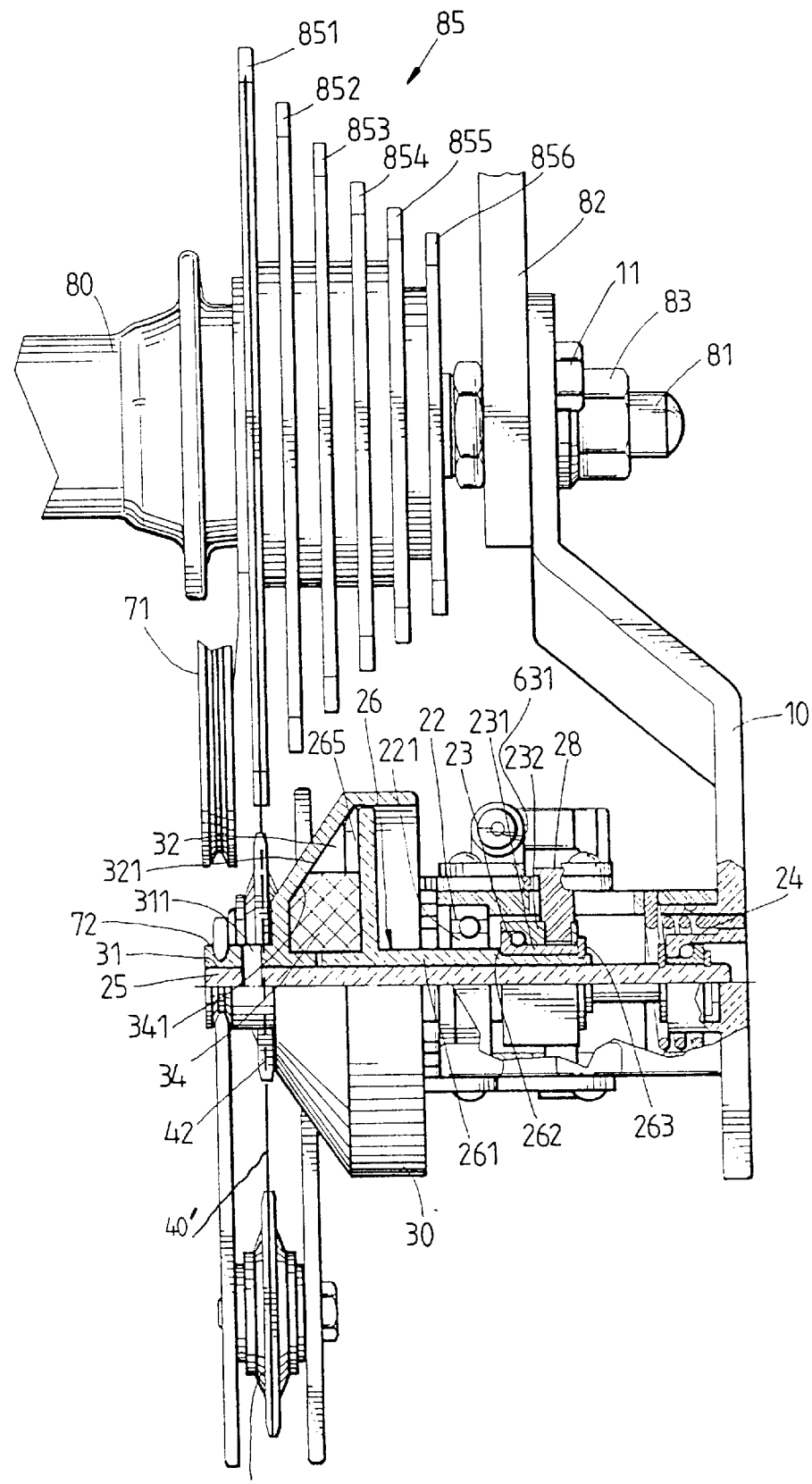
FIG. 3 shows a left side view of the drive chain guiding mechanism in relation to the largest tooth of the fly wheel gear cluster of the first preferred embodiment of the present invention.

As shown in FIGS. 1–3, an automatic gearshifting device of the bicycle multi-stage fly wheel of the first preferred embodiment of the present invention is composed of the component parts which are described hereinafter.

A fastening arm 10 is fastened at the top end thereof with a central axis 81 of a bicycle rear hub 80 such that the fastening arm 10 is located outside a rear fork end 82 of the bicycle frame, and that the fastening arm 10 is fastened by a fastening bolt 11 which is engaged with a nut 83 which is originally fastened with the central axis 81. The fastening arm 10 is provided at the bottom end thereof with a connector 12 which is provided with a semicircular groove 121.

A main body 20 is of a cylindrical construction and is provided with two open ends, with one end being engaged with the connector 12. The main body 20 is provided in the inner wall thereof with a semicircular groove 201 corresponding to the semicircular groove 121 of the connector 12. The fastening arm 10 and the main body 20 are fastened together by two fastening pins 202 which are forced into the semicircular grooves 121 and 201. The main body 20 is provided in the top thereof with a through hole 21 of a length and extending in the direction of the longitudinal axis of the main body 20. The main body 20 is further provided in the interior thereof with a first bearing 22, a second bearing 23, and a third bearing 24, which are arranged along the direction of the longitudinal axis of the main body 20 and are fastened pivotally with a rotary shaft 25.

A urging member 26 has a tubular body 261, which is fitted over the rotary shaft 25 such that the urging member 26 is capable of sliding along the direction of the longitudinal axis of the rotary shaft 25, and that the outer wall of the tubular body 261 is in contact with the inner rings 221 and 231 of the first and the second bearings 22 and 23. The second bearing 23 is fitted over the tail end of the tubular body 261 such that one side of the inner ring 231 thereof is in contact with a stepped portion 262 of the tubular body 261, and that another side of the inner ring 231 is in contact with an E-shaped retaining ring 263 which is fastened with the tail end of the tubular body 261 for preventing the second bearing 23 from slipping out. A connection member 28, which is a connection pin, is received in the through hole 21 of the main body 20 such that the tail end of the connection member 28 is fastened with the outer ring 232 of the second bearing 23. As the urging member 26 is caused to slide, the connection member 28 is actuated to slide along the through hole 21. The tubular body 261 is provided with a disklike urging portion 265 extending therefrom and opposite in location to another end of the second bearing 23.

A rotary member 30 is of a conical shell-like construction and has an open bottom. The rotary member 30 is provided with an axial hole 31 dimensioned to fit over the rotary shaft 25 such that the rotary member 30 and the rotary shaft 25 are fastened together by a fastening pin 311. The rotary member 30 is provided therein with a receiving cell 32 having an inclined plane 321. A plurality of weights 34 are disposed in the receiving cell 32 and are provided with an inclined plane 341 capable of making a full contact with the inclined plane 321. The urging portion 265 is located in the receiving cell 32 such that the urging portion 265 seals off the open end of the receiving cell 32, and that the urging portion 265 is in contact with each of the weights 34.

A drive chain guiding mechanism 40 to guide a drive chain 40' consists of a connection rod member 50 which is made up of a driving rod 51, the main body 20, a driven rod 52, and a fastening plate 53. The driving rod 51 is provided with a through hole 511 corresponding in location to the through hole 21 of the main body 20. The connection member 28 is fastened with the outer ring 232 of the second bearing 23 via the through holes 21 and 511. The urging member 26 is thus fastened pivotally with the connection rod member 50. The fastening plate 53 is fastened with a chain guiding arm 41 by an adjusting bolt 531 and an adjusting nut 534. The adjusting bolt 531 is fastened with the chain guiding arm 41 and is provided with a shaft sleeve 536 fitted thereover. The chain guiding arm 41 is provided at both ends thereof with a guide wheel 42 and an idle wheel 43. A torsion spring 44 is fitted over a first pivot 55 which is fastened pivotally with the driving rod 51 and the fastening plate 53, such that one free end of the torsion spring 44 urges the inner wall of the driving rod 51, and that another free end of the torsion spring 44 urges a second pivot 56 which is fastened pivotally with the driven rod 52 and the fastening plate 53. A compression spring 45 is fitted over the shaft sleeve 536 such that both ends of the spring 45 urge the shaft sleeve 536 and the chain guiding arm 41. A position confining screw 46 is fastened onto the fastening plate 53.

A gear confining mechanism 60 consists of a guide shell 61, a fastening piece 62, and a stopping piece 63. The fastening piece 62 is fastened with the third pivot 57 and the fourth pivot 58. The stopping piece 63 is fastened with the driving rod 51 and is provided with a through hole 631. The guide shell 61 is fastened with the fastening piece 62 by a microadjusting screw 611 such that the guide wire 612 of the guide shell 61 is put through the through hole 631 of the stopping piece 63 before being fastened with a stopping block 613. The guide shell 61 is fastened at the top end thereof with a moving rod (not shown in the drawings) which is fastened with the bicycle frame for regulating a distance D between the stopping block 613 and the through hole 631.

A transmission mechanism 70 consists of a first belted wheel 71 fastened coaxially with the fly wheel gear cluster 85 such that the first belted wheel 71 is located behind the largest tooth 851, a second belted wheel 72 fastened with the rotary member 30. The first and the second belted wheels 71 and 72 are provided with a transmission belt 73. When the cluster 85 turns, the rotary member 30 is actuated to turn.

As shown in FIGS. 1–3, when the bicycle is not in motion, the torsion spring 44 provides a biasing force for forcing the driving rod 51 to displace toward the fly wheel gear cluster 85 such that the top urging face 265 of the urging member 26 is actuated by the connection member 28 and the second bearing 23 to move toward the receiving cell 32 of the rotary member 30 so as to urge the weights 34 in such a manner that the inclined plane 341 of the weights 34 to be in contact with the inclined plane 321 of the receiving cell 32. In the meantime, the guide wheel 42 and the idle wheel 43 are caused by the connection rod member 50 to locate under the largest tooth 851 of the cluster 85. The chain guiding arm 41 is adjusted by the adjusting bolt 534 to be located right under the largest tooth 851 so as to keep the drive chain (not shown in the drawings) to run on the largest tooth 851, the guide wheel 42 and the idle wheel 43 in a straight line manner.

Figure 4:
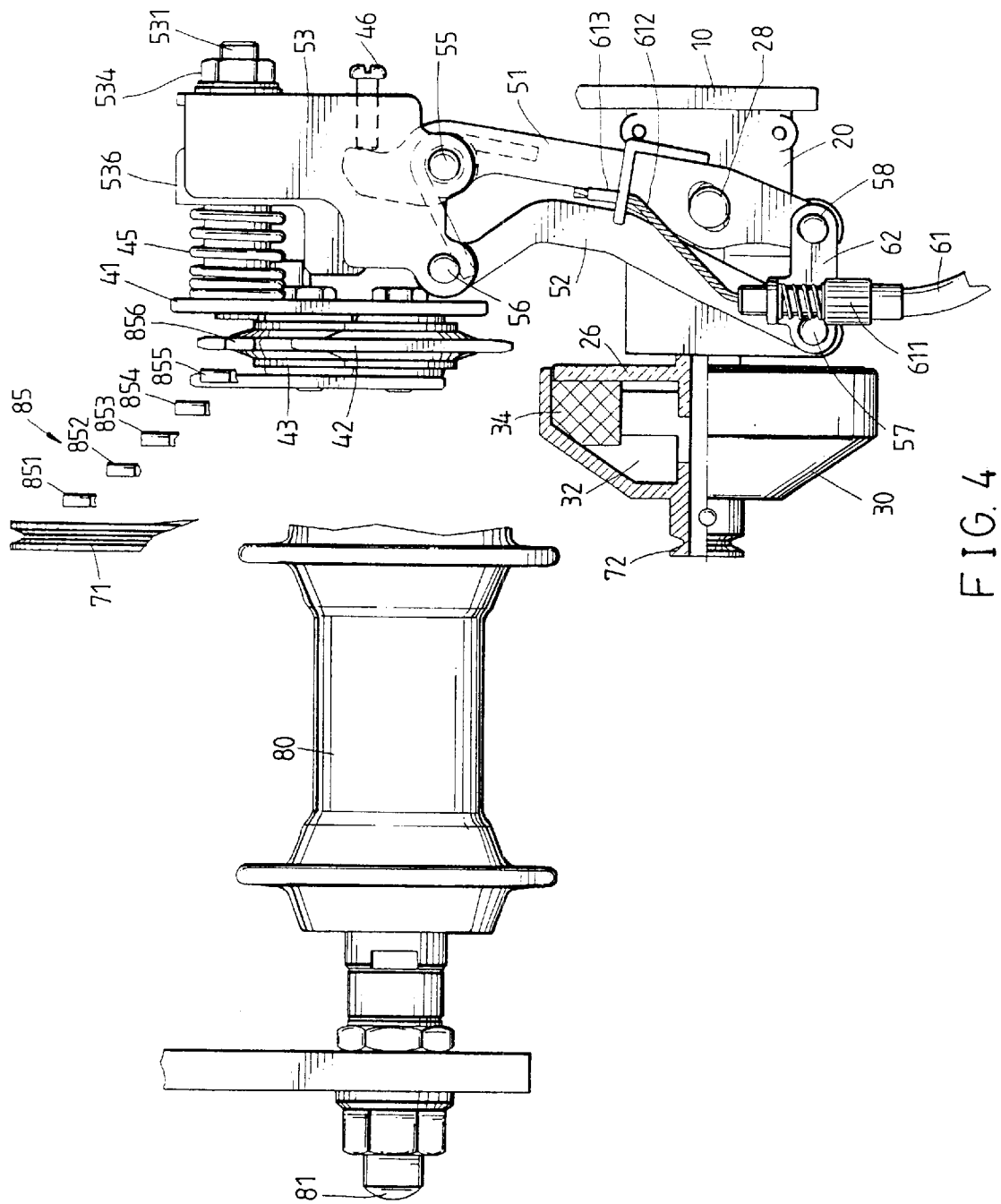
FIG. 4 shows a top view of the drive chain guiding mechanism in relation to the smallest tooth of the fly wheel gear cluster of the first preferred embodiment of the present invention.
Figure 5:
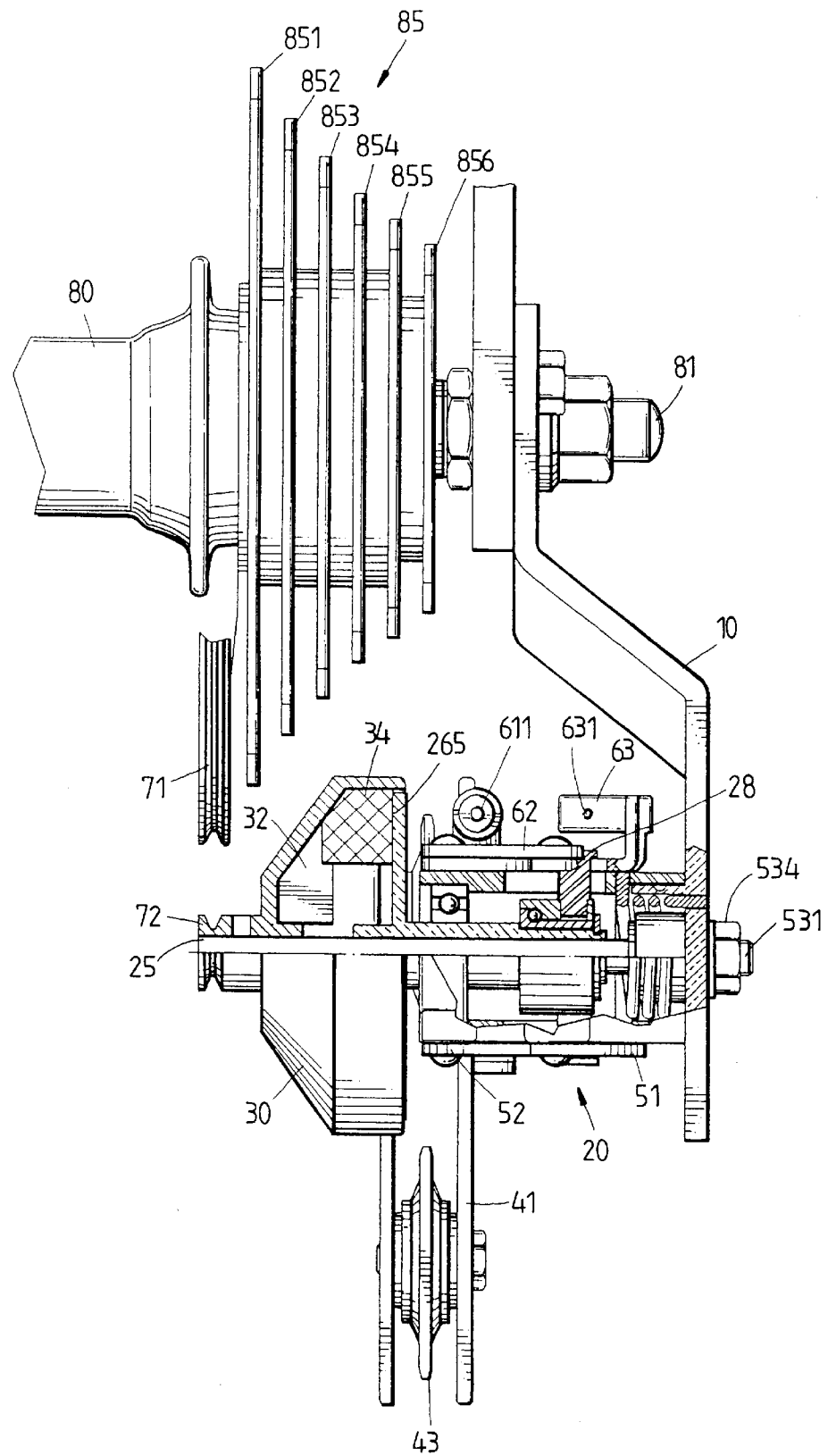
FIG. 5 shows a left side view of the drive chain guiding mechanism in relation to the smallest tooth of the fly wheel gear cluster of the first preferred embodiment of the present invention.

As shown in FIGS. 4 and 5, when the bicycle is in motion such that the bicycle is accelerated, the rotary member 30 is actuated by the transmission mechanism 70 to turn faster so as to cause the weights 34 to slide along the inclined plane 321 to move away from the center of the rotary shaft 25. An axial displacement force is thus imparted to the urging member 26, which is caused to displace. The displacement force is then imparted to the driving rod 51 via the connection member 28 such that the driving rod 51 overcomes the biasing force of the torsion spring 44 to swivel on the fourth pivot 58 acting as a fulcrum. As a result, the chain guiding arm 41 is actuated to move toward the smallest tooth 856 of the cluster 85 so as to enable the drive chain to switch automatically to increase the pedaling gear ratio. In the event that the bicycle in motion is slowed down by a road condition, such as an uphill slope, the urging force of the urging member 26 is overcome by the torsion spring 44 to force the chain guiding arm 41 to move in reverse and toward the largest tooth 851 of the cluster 85 to effect an automatic gearshifting, thereby resulting in a change in the pedaling gear ratio to maximize the pedaling effect.

In order to prevent the disengagement of the drive chain at the time when the chain guiding arm 41 is continuously forced to move toward the outside of the smallest tooth 856 by the high speed operation of the bicycle, the depth by which the position confining screw 46 is fastened onto the fastened plate 53 is adjusted to locate the guide wheel 42 and the idle wheel 43 at the position of the smallest tooth 856 of the cluster 85, so as to cause the driving rod 51 to be in contact with the bottom end of the screw 46, as shown in FIG. 4. As a result, the driving rod 51 is prevented from being acted on by the centrifugal force to swivel aside to result in the disengagement of the drive chain. The allowable moving distance of the driving rod 51 can be determined by manipulating the moving rod of the gear confining mechanism 60 to regulate the distance D between the stopping block 613 and the through hole 631 of the stopping piece 63. As a result, the stroke by which the chain guiding arm 41 moves from the largest tooth 851 to another tooth can be regulated at the time when the bicycle is cruising at a maximum speed. In the event that the distance D is shortened, the driving rod 51 is retained by the stopping block 613 such that the chain guiding arm 41 is located at a tooth 855 next to the smallest tooth 856, or other teeth 854, 853 or 852. The final pedaling gear ration may be determined by the bicyclist in accordance with the physical condition of the bicyclist.

Figure 6:
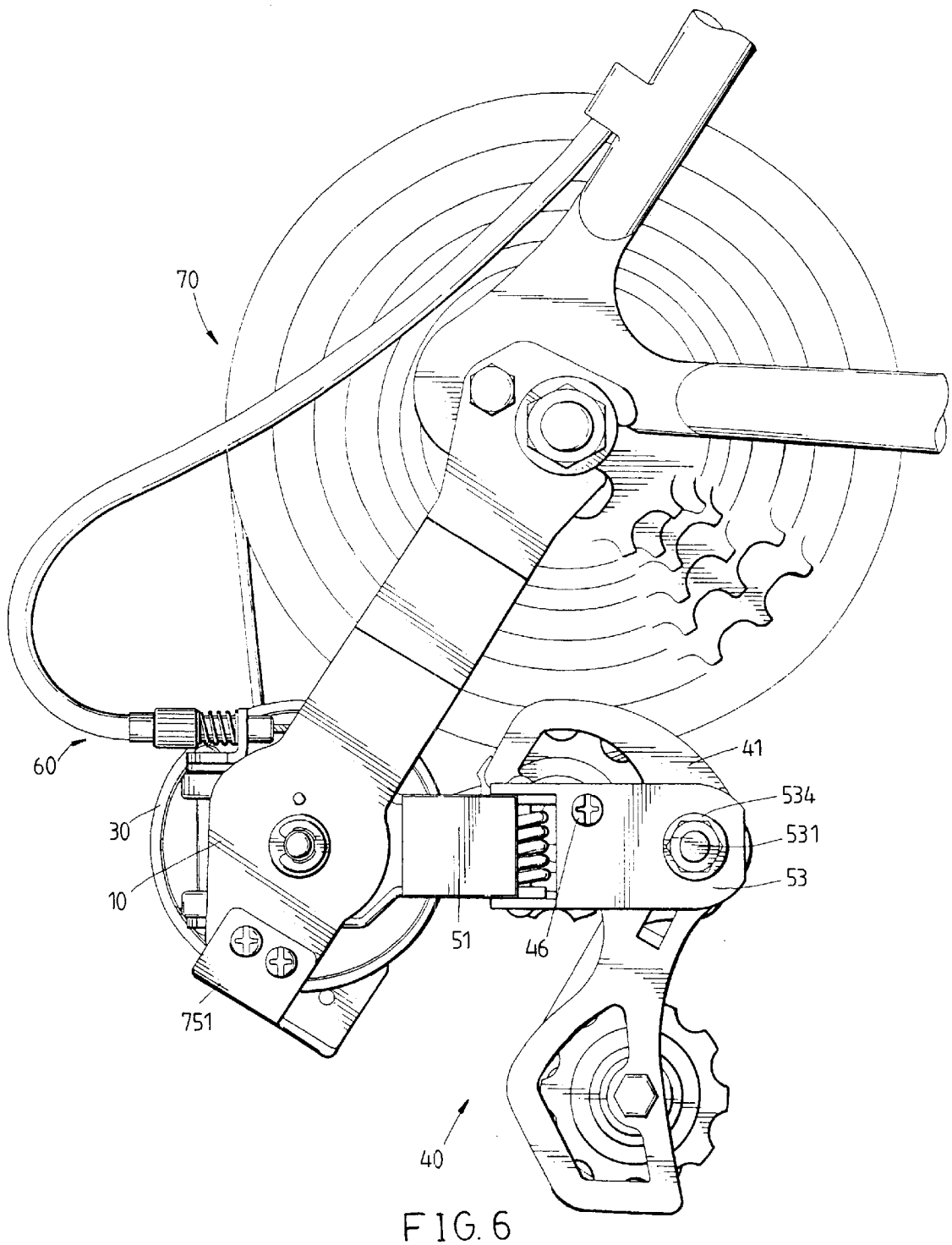
FIG. 6 shows a front view of a second preferred embodiment of the present invention.
Figure 7:
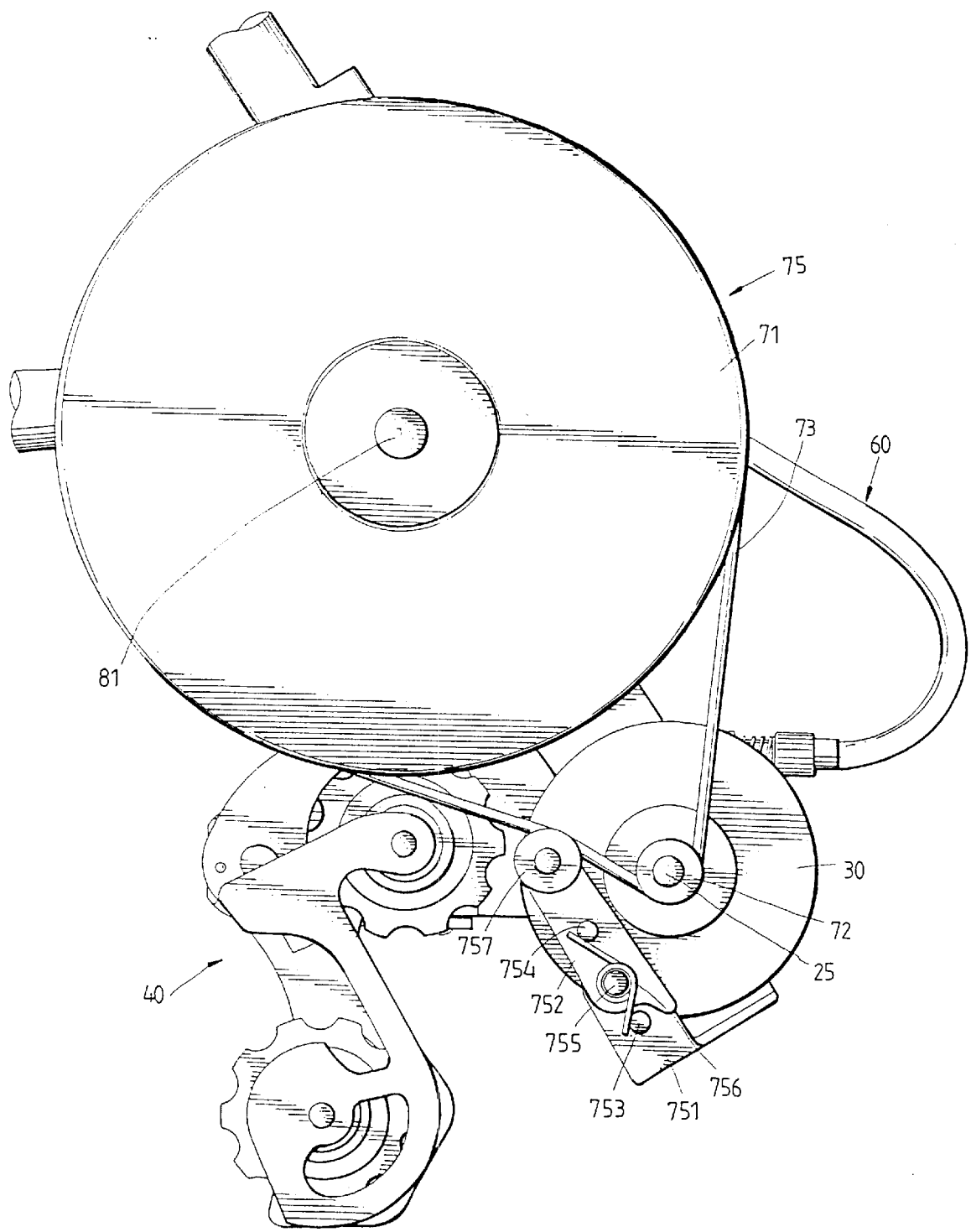
FIG. 7 shows a rear view of the second preferred embodiment of the present invention.
Figure 8:
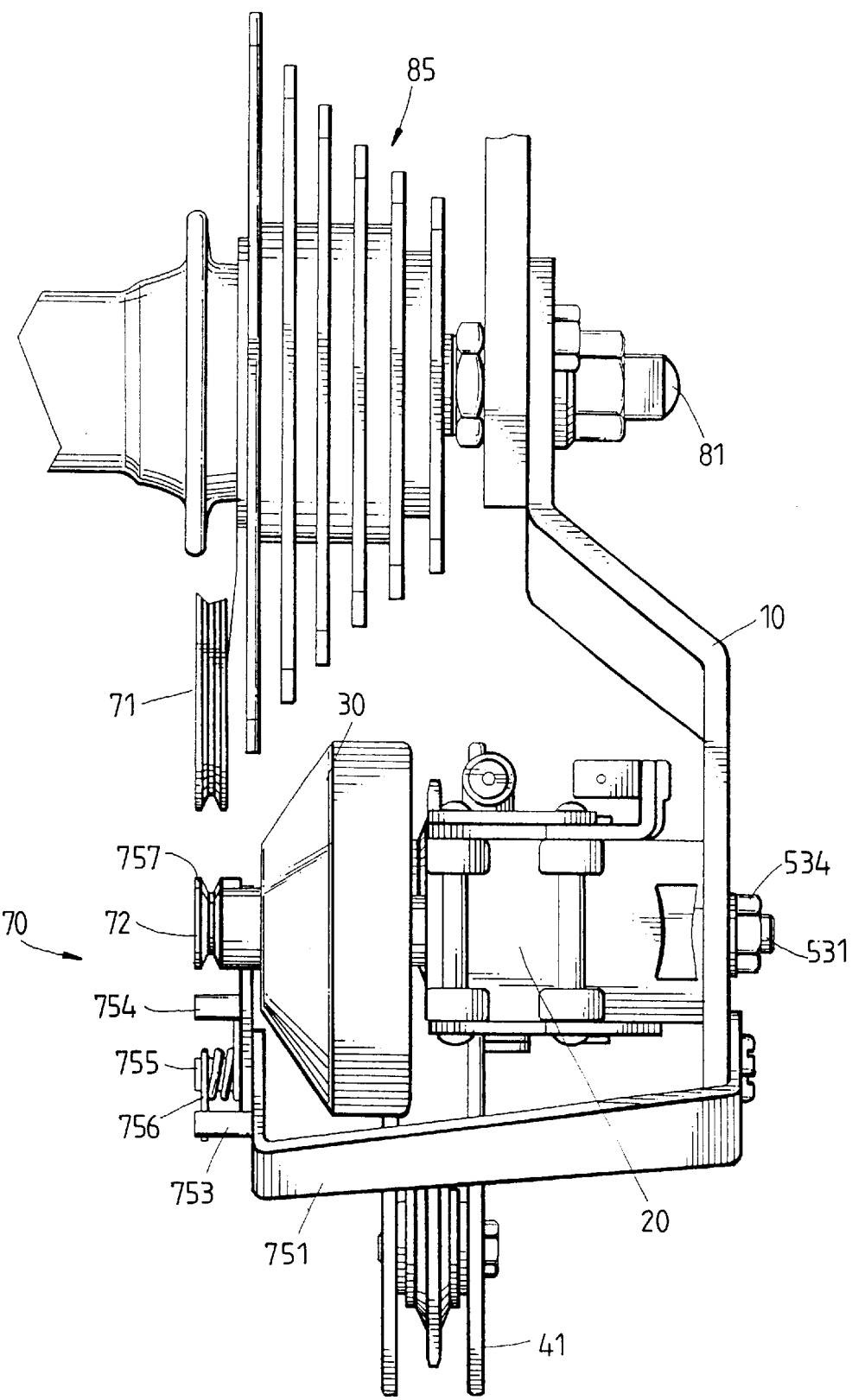
FIG. 8 shows a left side view of the second preferred embodiment of the present invention.

As shown in FIGS. 6–8, a transmission mechanism of the second preferred embodiment of the present invention further comprises a tension adjusting unit 75 having a U-shaped fastening piece 751 located between the main body 20 and the rotary member 30 such that the fastening piece 751 is fastened with the fastening arm 10 and a swing arm 752. The fastening piece 751 and the swing arm 752 are provided respectively with a locating pillar 753, 754. A torsion spring 756 is fitted over a pivoting place 755 between the swing arm 752 and the fastening piece 751 such that the torsion spring 756 urges the locating pillars 753 and 754. An idle wheel 757 is fastened pivotally with the swing arm 752 such that the idle wheel 757 is in contact with the belt 73. The belt 73 can be tightened by the force of the torsion spring 756 via the idle wheel 757, so as to maximize the transmission effect of the belt 73.

What is claimed is:

1. An automatic gearshifting device of a bicycle multistage fly wheel, said device comprising:

a main body provided with a rotary shaft fastened pivotally therewith;

a fastening arm fastened with said main body and a bicycle frame;

a rotary member fastened with said rotary shaft and provided with a receiving cell;

an urging member fastened with said rotary shaft such that said urging member is capable of sliding in the direction of a longitudinal axis of said rotary shaft, and that one end of said urging member is located in said receiving cell;

a plurality of weights located in said receiving cell such that said weights are in contact with said rotary member;

a drive chain guiding mechanism for shifting a drive chain from one tooth to another tooth of a fly wheel gear cluster;

a connection member connecting said urging member with said drive chain guiding mechanism; and a transmission mechanism connecting said rotary shaft with said fly wheel gear cluster;

said urging member capable of being actuated by a centrifugal force of said weights in motion to displace in the direction of the longitudinal axis of said rotary shaft so as to enable said drive chain guiding mechanism to shift said drive chain from one tooth to another tooth of the fly wheel gear cluster;

wherein said receiving cell is provided with an inclined plane; and wherein said weights are driven by said rotary shaft to slide along said inclined plane.

2. The device as defined in claim 1, wherein said fastening arm is fastened at one end thereof with a bicycle rear hub, and at another end thereof with said main body.

3. The device as defined in claim 1, wherein said weights are provided with an inclined plane capable of cooperating with said inclined plane of said receiving cell.

4. The device as defined in claim 1, wherein said urging member has a tubular body dimensioned to fit over said rotary shaft to enable said urging member to slide on said rotary shaft.

5. The device as defined in claim 4, wherein said body of said urging member is provided with an urging portion, said urging portion being located in said receiving cell such that said urging portion is in contact with said weights.

6. The device as defined in claim 1, wherein said drive chain guiding mechanism consists of a connection rod member fastened pivotally with said main body, and a chain guiding arm connected with said connection rod member and fastened pivotally with a guide wheel and a first idle wheel.

7. The device as defined in claim 6, wherein said connection rod member consists of a driving rod fastened pivotally with said main body, a driven rod fastened pivotally with said main body, a fastening plate fastened pivotally with said driving rod and said driven rod, and a torsion spring located at a pivoting position of said driving rod and said fastening plate; wherein said chain guiding arm is fastened with said fastening plate; and wherein said connection member is fastened with said driving rod.

8. The device as defined in claim 7, wherein said drive chain guiding mechanism further consists of a position confining screw, said screw being fastened onto said fastening plate such that a point end of said screw is separated from said driving rod by a distance.

9. The device as defined in claim 7, wherein said chain guiding arm is fastened with said fastening plate by a bolt, said bolt provided with a compression spring fitted thereover such that said chain guiding arm and said fastening plate are urged by said compression spring.

10. The device as defined in claim 7 further comprising a gear confining mechanism having a guide wire located in said driving rod for regulating an extent to which said driving rod is caused to swivel so as to confine a stroke of said drive chain.

11. The device as defined in claim 1, wherein said transmission mechanism comprises:

a first belted wheel fastened coaxially with a central axis of said fly wheel gear cluster;

a second belted wheel fastened with said rotary member; and a transmission belt running on said first belted wheel and said second belted wheel.

12. The device as defined in claim 11, wherein said transmission mechanism further comprises a tension adjusting unit for adjusting the tension of said transmission belt.

13. The device as defined in claim 12, wherein said tension adjusting unit comprises:

a fastening piece fastened with said main body;

a swing arm fastened pivotally with said fastening piece and a second idle wheel; and a torsion spring fitted over a pivoting position of said swing arm and said fastening piece such that said torsion spring is capable of forcing said second idle wheel to press against said belt tightly.

* * * * *